(12) United States Patent
Carr et al.

(10) Patent No.: US 6,474,500 B1
(45) Date of Patent: Nov. 5, 2002

(54) METHOD AND MEANS FOR PLANTING FIELD SEEDS IN ROWS WITH DIFFERENT VARIETIES OF SEEDS

(75) Inventors: Brian W. Carr, Nevada, IA (US); Peter B. Moore, Ames, IA (US); Donald F. Handorf, Ames, IA (US); Nick Merfeld, Nevada, IA (US); Ryan D. Jensen, Huxley, IA (US); Scott A. Sporrer, Nevada, IA (US); Chester S. Creswick, Newton, IA (US)

(73) Assignee: Gary W. Clem, Inc., Nevada, IA (US)

( * ) Notice: Subject to any disclaimer, the term of this patent is extended or adjusted under 35 U.S.C. 154(b) by 0 days.

(21) Appl. No.: 09/569,511

(22) Filed: May 12, 2000

(51) Int. Cl.$^7$ ................................................ G07F 11/66
(52) U.S. Cl. ........................................... 221/25; 221/79
(58) Field of Search .............................. 221/25, 26, 1, 221/30, 72, 70, 79, 80, 88, 103, 112, 115, 113; 111/70, 77

(56) References Cited

U.S. PATENT DOCUMENTS

| 4,023,509 A | | 5/1977 | Hanson | |
| 4,148,414 A | * | 4/1979 | Parks, Jr. | 221/278 |
| 6,024,247 A | * | 2/2000 | Birr | 221/26 |

* cited by examiner

Primary Examiner—Kenneth W. Noland

(57) ABSTRACT

A method of planting field seeds in rows with different varieties of seeds involves determining the variety of the seeds to be planted; placing the seeds for rows of predetermined length in different groups in elongated cell pack strips for each variety, with each cell pack strip including individual cells with individual seeds. A plurality of subgroups of cell pack strips are selected sequentially from the groups of cell pack strips in chronological order that they are to be planted in a single row in a field. The subgroups are then placed in magazines to maintain the order of the subgroups for the subsequent planting. The locations in a field are determined where the varieties are to be planted. The magazines are mounted on a field row planter with the magazines being associated with rows in the field to which the respective magazines correspond. The planter is moved longitudinally through the field. The cell pack strips are sequentially and chronologically selected from the magazines containing the seeds to be planted. The cells of the cell pack strip are sequentially broken in the order in which the seeds in each cell pack strip are to be planted to release the seeds from the cells. The released seeds are deposited from each cell to the soil in the row in which the magazine from when it emanated was associated. An individual electronic bar code is placed on each cell pack to indicate the variety of the seed in the seed pack intended for planting in a row in the field. The bar codes are electrically scanned and compared electronically to a row blueprint of the field to be planted when the magazines are mounted on the field row planter to verify that the seeds in the magazines are consistent with the row blueprint. An apparatus for planting the seeds from the cell pack is provided.

30 Claims, 14 Drawing Sheets

METHOD AND MEANS FOR PLANTING FIELD SEEDS IN ROWS WITH DIFFERENT VARIETIES OF SEEDS

BACKGROUND OF THE INVENTION

In research fields for hybrid seeds and the like, the seeds of different varieties and spacing are planted in short parallel rows in given plots interrupted by alleys that extend across the field perpendicular to the rows. The managing and the planting of different seeds in different rows in different plots is difficult at planting time especially when planting is conducted by a row type planter moving through the field at a speed close to 6 m.p.h. This process is complicated if varying seed sizes are used in the research plots.

It is critical to singulate seed for such planting, and it is especially difficult to endeavor to singulate the seeds in the field or during the planting process. Typically, many seed companies are using seed counters to fill envelopes which are ultimately taken to the field and planted. To have the seeds singulated in the laboratory and then to recombine the seed in the envelope and deliver it to the field for singulation is again is very complicated. Singulation in the field should be done at a higher rate (18–80 seeds per second), while conventional seed counters operate at a slower speed of 5–10 seeds per second.

It is therefore a principal object of this invention to singulate seeds in the laboratory in the precise sequence that they are to be planted in a given row in the field.

It is a further object of this invention to expedite the singulation of seeds for use in a plurality of fields, and then to select subgroups from the singulated seeds for use in a specific field for ultimate planting.

A further object of this invention is to monitor all aspects of the process including the singulation of seeds, and the planting of the seeds in the research field to be consistent with the planting blueprint of the field, and to detect any errors that might occur in the process.

These and other objects will be apparent to those skilled in the art.

SUMMARY OF THE INVENTION

A method of planting field seeds in rows with different varieties of seeds involves determining the variety of the seeds to be planted; placing the seeds for rows of predetermined length in different groups in elongated cell pack strips for each variety, with each cell pack strip including individual cells with individual seeds. A plurality of subgroups of cell pack strips are selected sequentially from the groups of cell pack strips in chronological order that they are to be planted in a single row in a field. The subgroups are then placed in magazines to maintain the order of the subgroups for the subsequent planting.

The locations in a field are determined where the varieties are to be planted. The magazines are mounted on a field row planter with the magazines being associated with rows in the field to which the respective magazines correspond. The planter is moved longitudinally through the field. The cell pack strips are sequentially and chronologically selected from the magazines containing the seeds to be planted. The cells of the cell pack strip are sequentially broken in the order in which the seeds in each cell pack strip are to be planted to release the seeds from the cells. The released seeds are deposited from each cell to the soil in the row in which the magazine from whence it emanated was associated. An individual electronic bar code is placed on each cell pack to indicate the variety of the seed in the seed pack intended for planting in a row in the field. The bar codes are electrically scanned and compared electronically to a row blueprint of the field to be planted when the magazines are mounted on the field row planter to verify that the seeds in the magazines are consistent with the row blueprint.

A cell pack strip for planting seeds includes a first elongated flat layer with a second elongated layer superimposed thereover. The second layer has a plurality of enclosed cell enclosures extending upwardly therefrom with the seed in each of the cells. Each of the seeds is of a variety selected from a predetermined list of seeds on a predetermined seed row blueprint.

A seed magazine has a rectangular housing having at least opposite sides, one end and a bottom. A discharge opening is formed in the housing, and a plurality of elongated seed pack strips are stacked within the magazine on the bottom thereof and in between the sides with one end of the lowermost seed pack strip terminating adjacent the discharge opening. Each cell pack strip has a row of spaced apertures located along opposite side edges of the cell pack strip.

An apparatus for planting seed has a seed row planter frame, a plurality of row planting units on the frame, and a magazine assembly associated with each planter unit. At least one seed magazine in each magazine assembly has a plurality of elongated cell pack strips horizontally stacked in the seed magazine. A plurality of enclosed seed cells with the seed therein is located on each cell pack strip. Means are provided on the planter unit for extracting sequentially the cell plant strips from the magazine, and for individually and sequentially extracting the seed from each cell and depositing the seed in one of the row planting units for planting. A computer controller is operatively available for controlling and coordinating the extracted cell pack strips from the magazine, and for extracting the seed from the seed cells as the seed row planter is moved longitudinally over a field to be planted.

DESCRIPTION OF THE PREFERRED EMBODIMENT

Figure 1A:
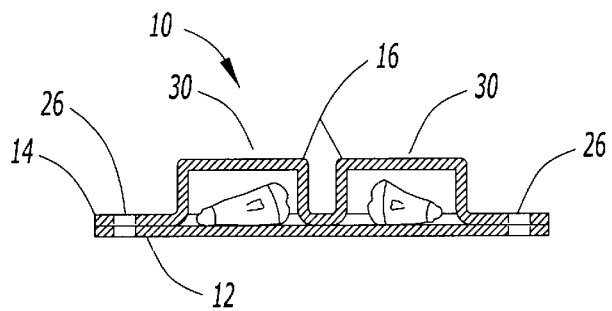
FIG. 1A is a sectional view taken on line 1A—1A of FIG. 1.
Figure 1:
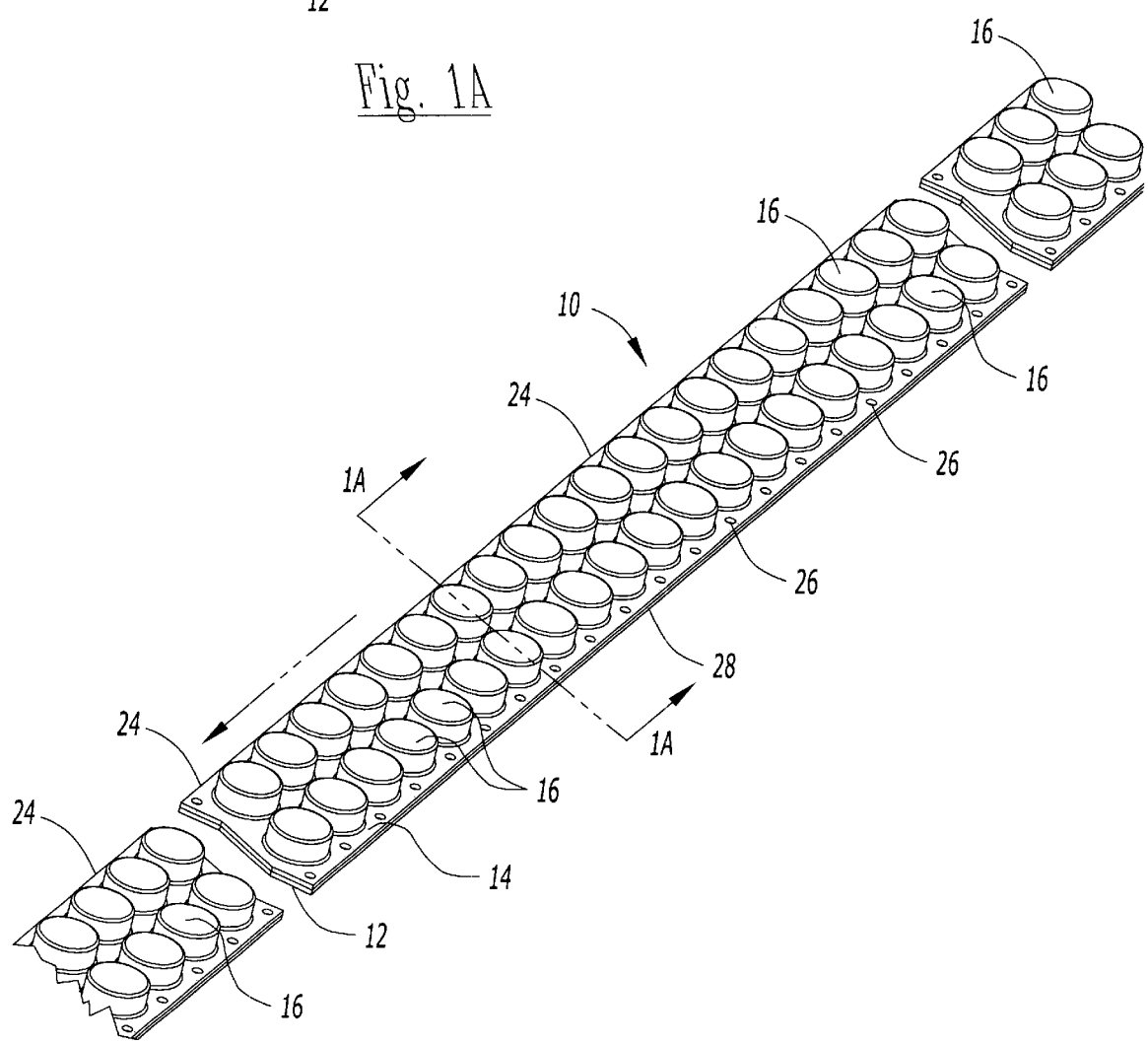
FIG. 1 is a perspective view of a cell pack of this invention showing the top surface thereof.

With reference to FIG. 1, a cell pack 10 is comprised of a flat base layer 12 (FIG. 1A); and a top layer 14 which has two rows of a plurality of cells or blisters 16.

Figure 2:
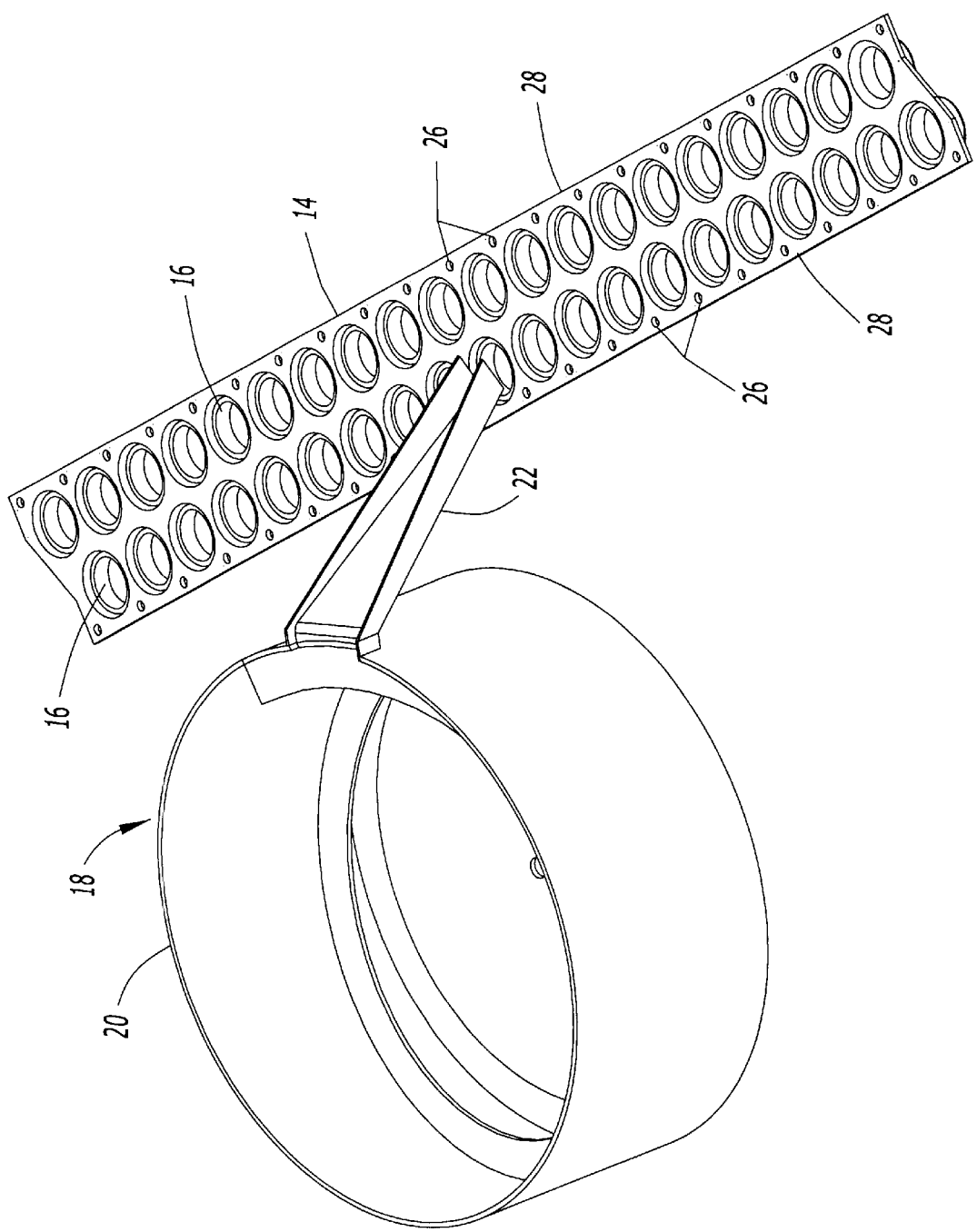
FIG. 2 is a perspective view of a cell pack being loaded with seed from a seed makeup bowl into the bottom of the cell pack.

With reference to FIG. 2, a vibratory seed makeup bowl 18 includes a conventional container 20 and spout 22 which is adapted to meter or count seeds in the container into any desired receptacle. In FIG. 2, the bowl 18 with spout 22 is in a position to deposit seeds into the open cell 16 of cell pack strip 24 (before base layer 12 is adhesively or otherwise secured to layer 14). It should be noted that two rows of perforations 26 extend along the side edges 28 of the cell pack strip 24 to facilitate the longitudinal movement thereof as will be described hereafter. A corn seed 30 is shown within the cell 16 (FIG. 1A), as well as outside the cell 16 in FIG. 4 where the corn seeds are being removed from the cells. A bar code strip (not shown) identifying a specific strip 24 is secured to the bottom surface of layer 12.

Figure 6:
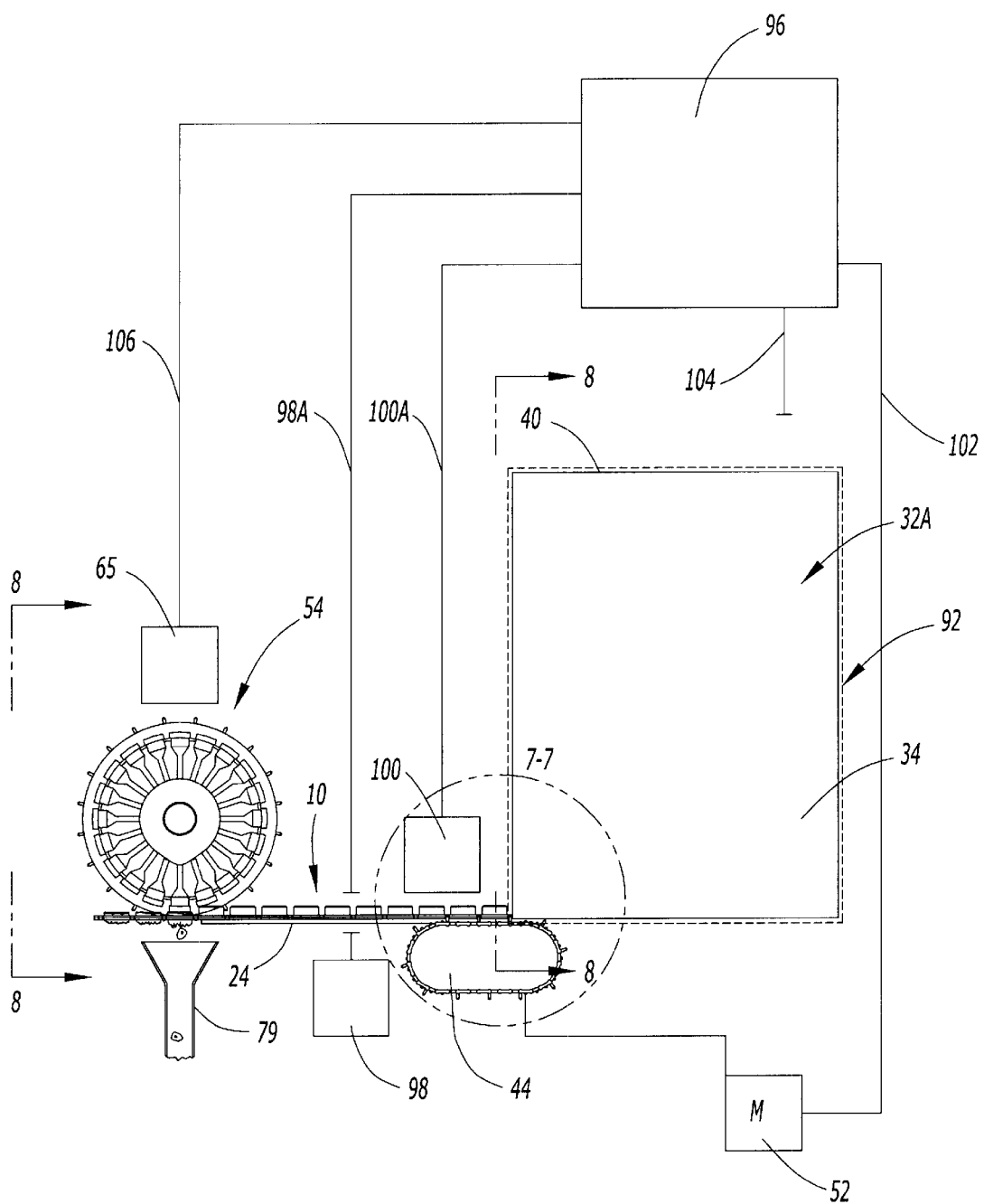
FIG. 6 is a schematic view at a reduced scale of the system for utilizing the cell packs; and for removing of the seeds from the cell pack for planting purposes.
Figure 7:
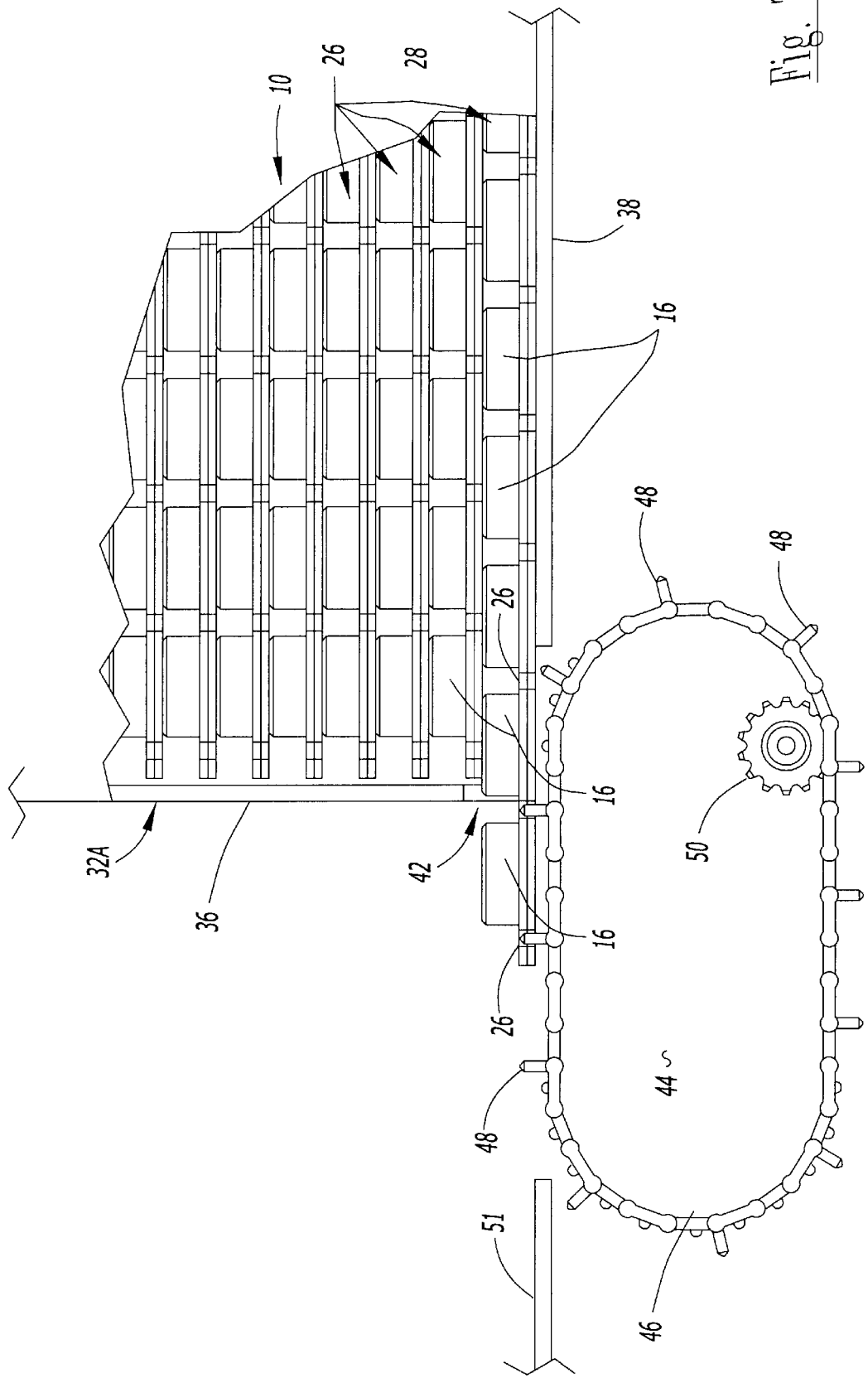
FIG. 7 is an enlarged scale sectional view taken generally on line 7—7 of FIG. 6.
Figure 7A:
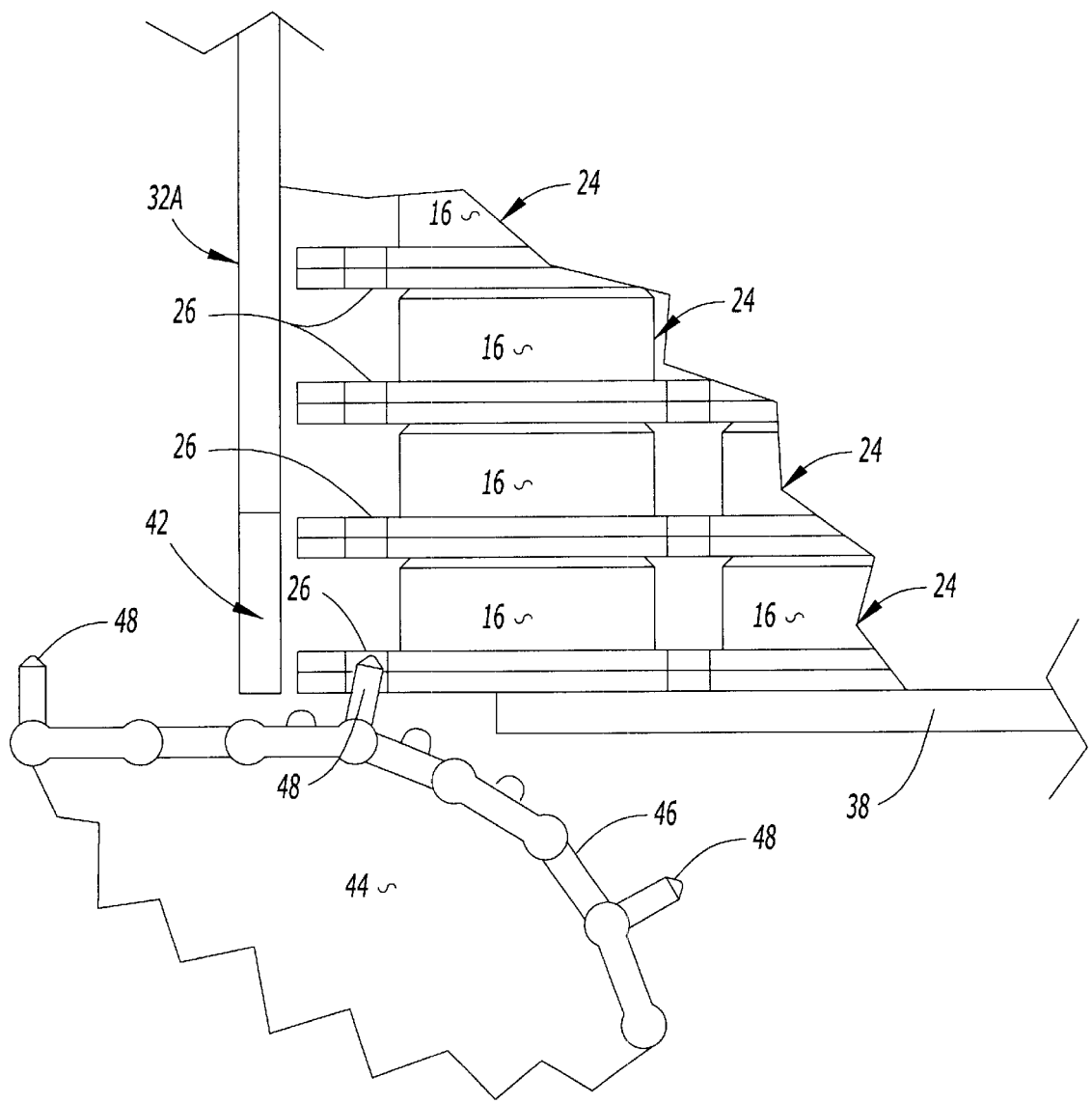
FIG. 7A is an enlarged scale sectional view of a portion of FIG. 7 showing the operational components in a different posture.
Figure 9:
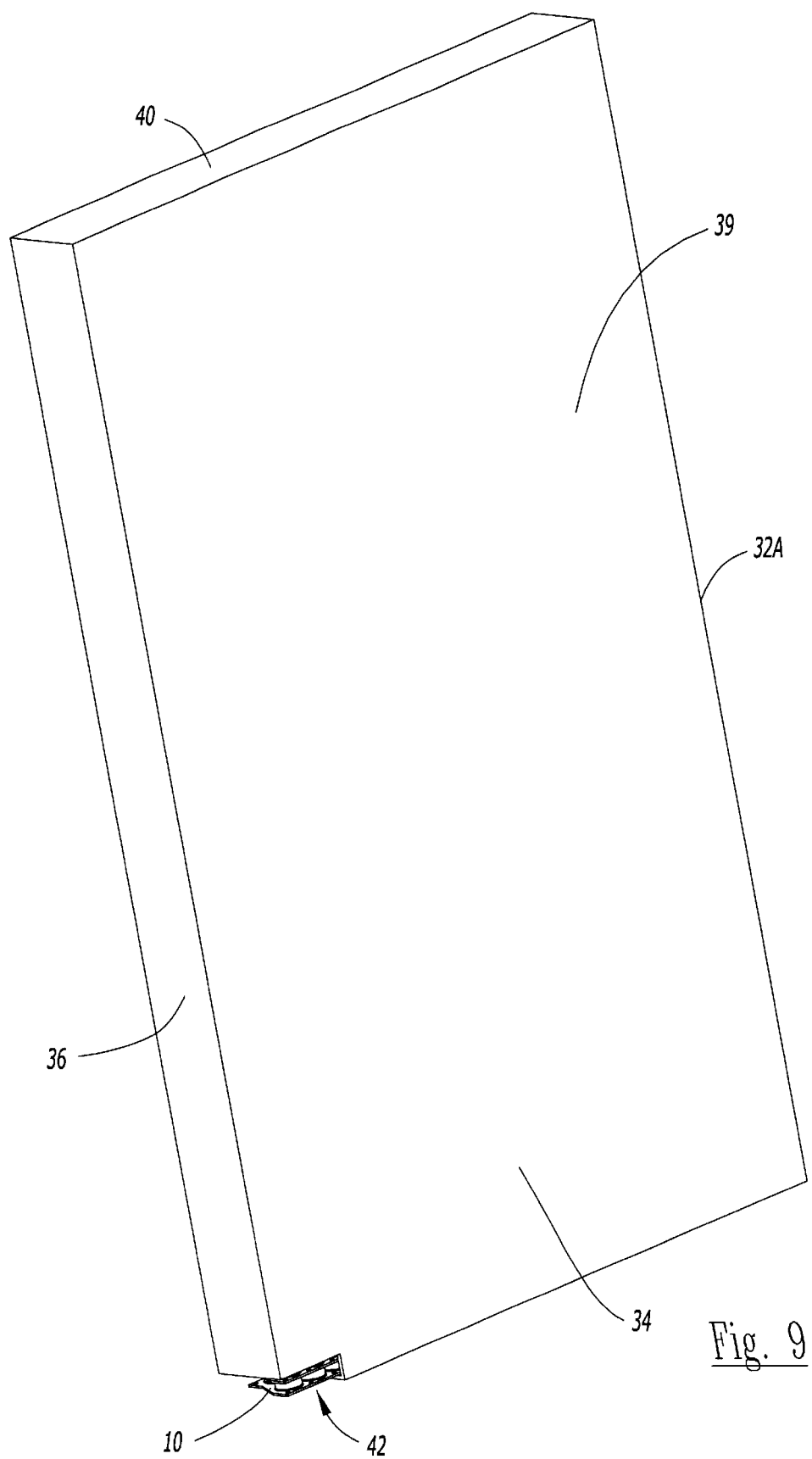
FIG. 9 is a perspective view of a magazine for the cell packs.
Figure 10:
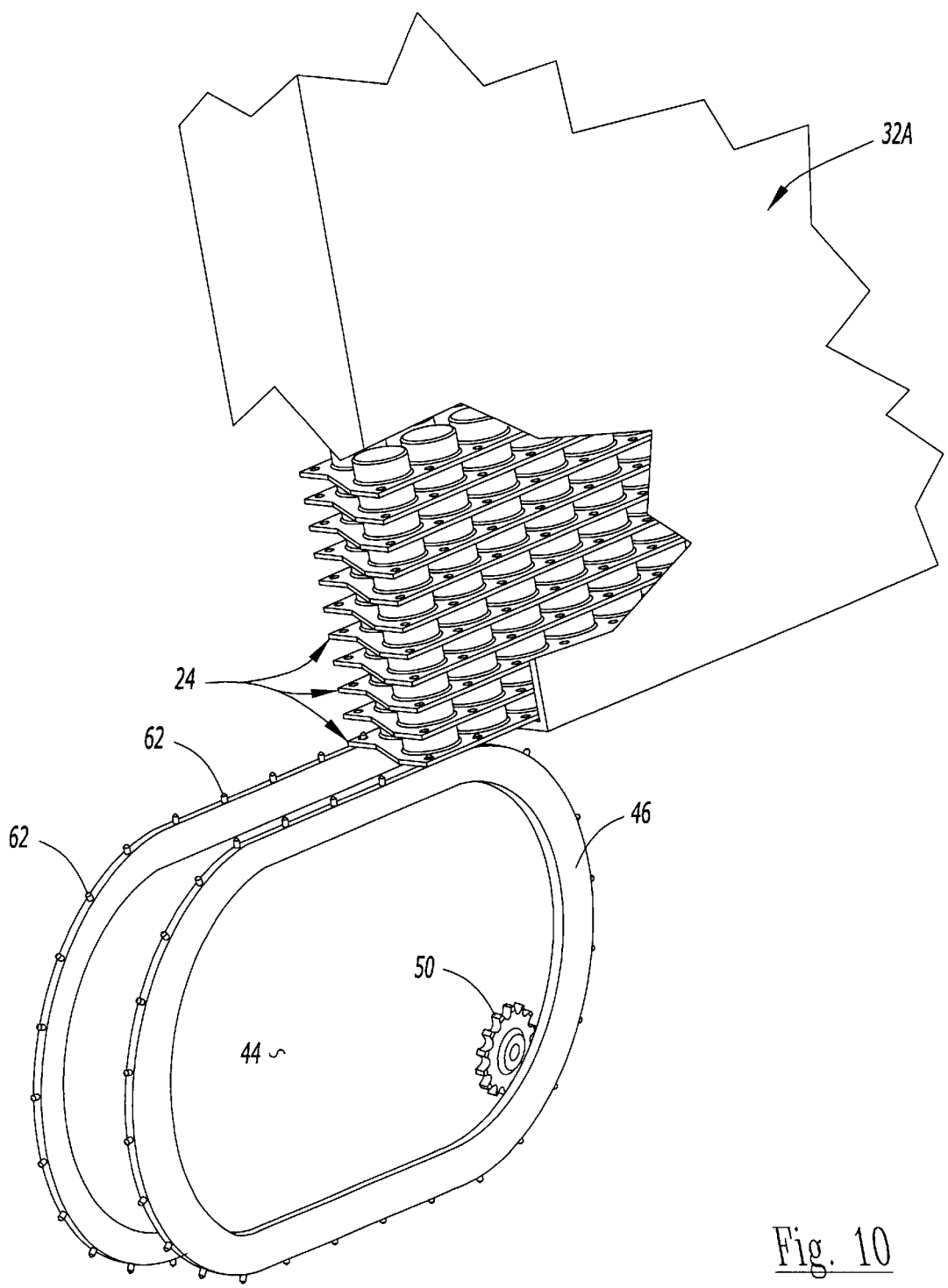
FIG. 10 is an enlarged perspective view of a portion of the magazine of FIG. 9.

Magazines 32A, 32B, 32C and 32D are rectangular containers which each have opposite sides 34, opposite ends 36, bottoms 38, and open tops 40 (FIG. 9). A rectangular discharge opening 42 is located in one bottom corner of each magazine (see magazine 32A in FIGS. 9 and 10). A pair of chain tracks 44 similar to a chain bar for a chain saw, are located immediately below the discharge opening 42 (FIGS. 6 and 10). A flexible chain 46 encircles the bars 44, and a plurality of elongated narrow pins 48 are secured to the chain and extend rearwardly outwardly therefrom. A drive gear 50 (FIG. 10) is operatively connected in any conventional way to motor 52 (FIG. 6). Moving chain 46 moves strip 24 onto track 51 (FIG. 7) as pins 48 penetrate perforations 26 on strip 24.

With reference to FIGS. 3, 4, 5 and 6, a punch wheel 54 is located laterally and downstream from the discharge opening 42 in magazine 32A. Punch wheel 54 is comprised of a circular drum 56 which has vertical side flanges 58 secured in a vertical plane on opposite sides of the drum. The flanges 58 have peripheral edges 60 from which pins 62 extend. Pins 62 are of the same type as pins 48 described heretofore.

Figure 3:
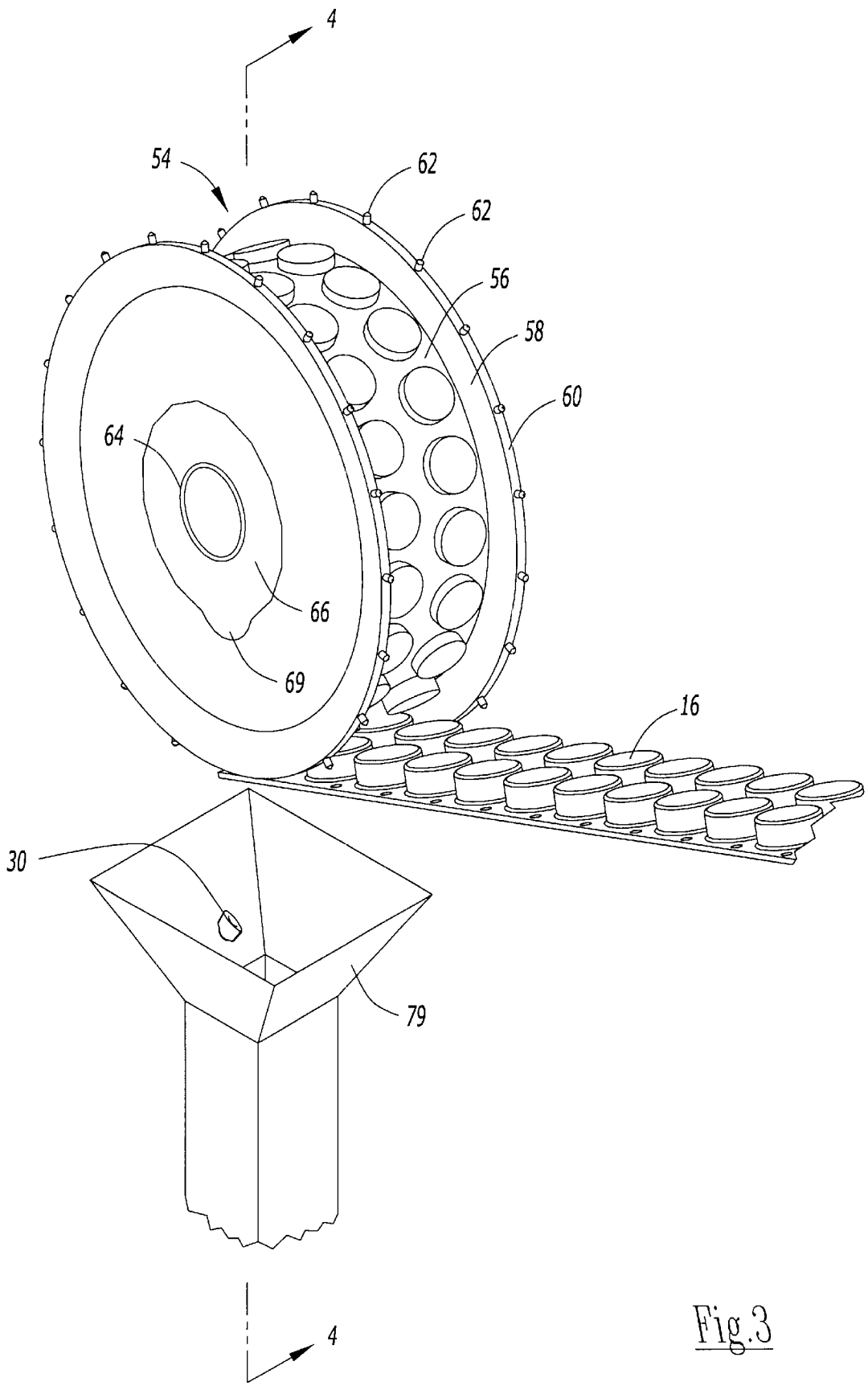
FIG. 3 is a partial perspective view of a punch wheel of this invention shown at an enlarged scale which effects the removal of seeds from the cell pack.
Figure 4:
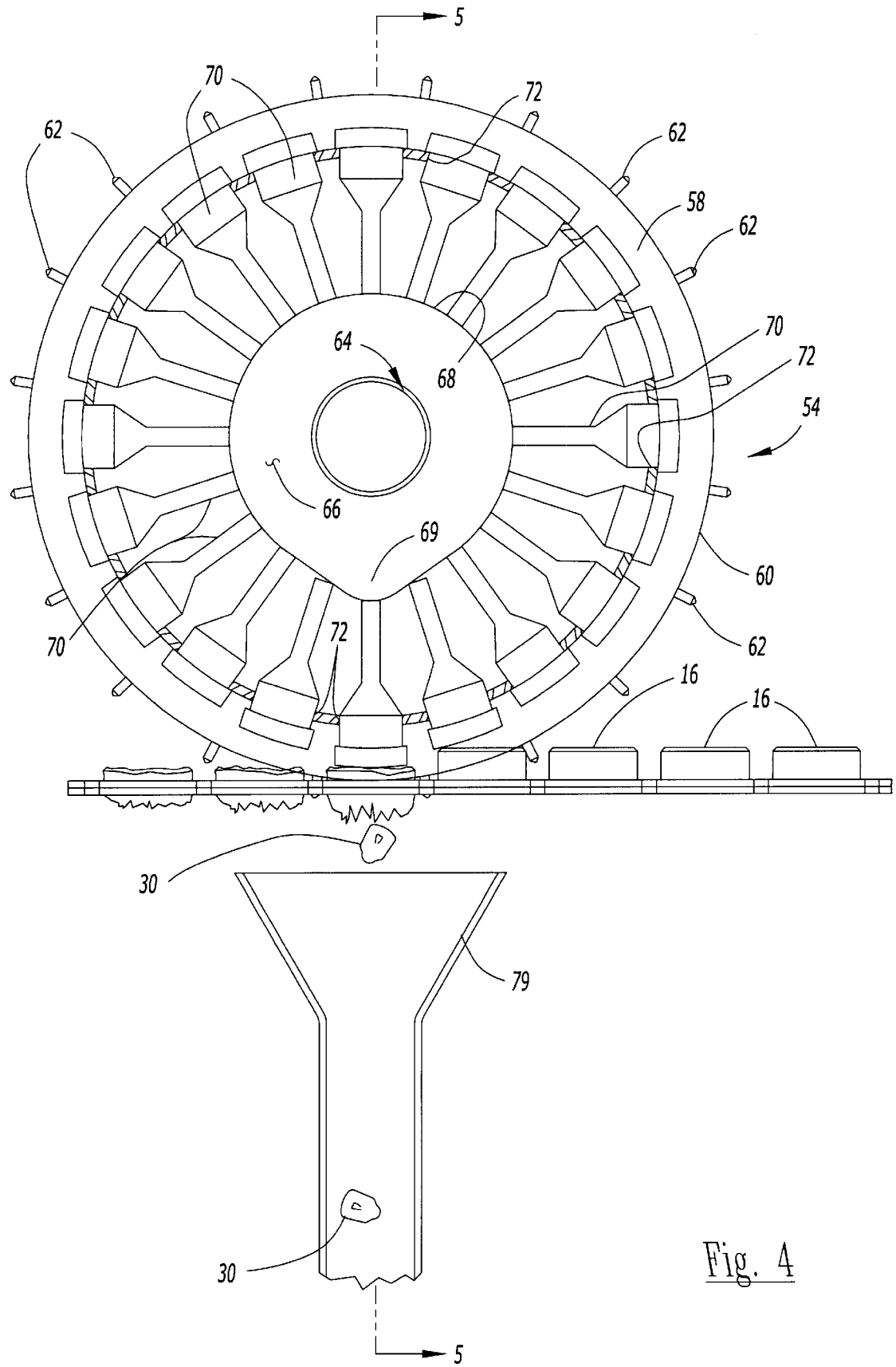
FIG. 4 is a vertical sectional view taken on line 4—4 of FIG. 3.
Figure 5:
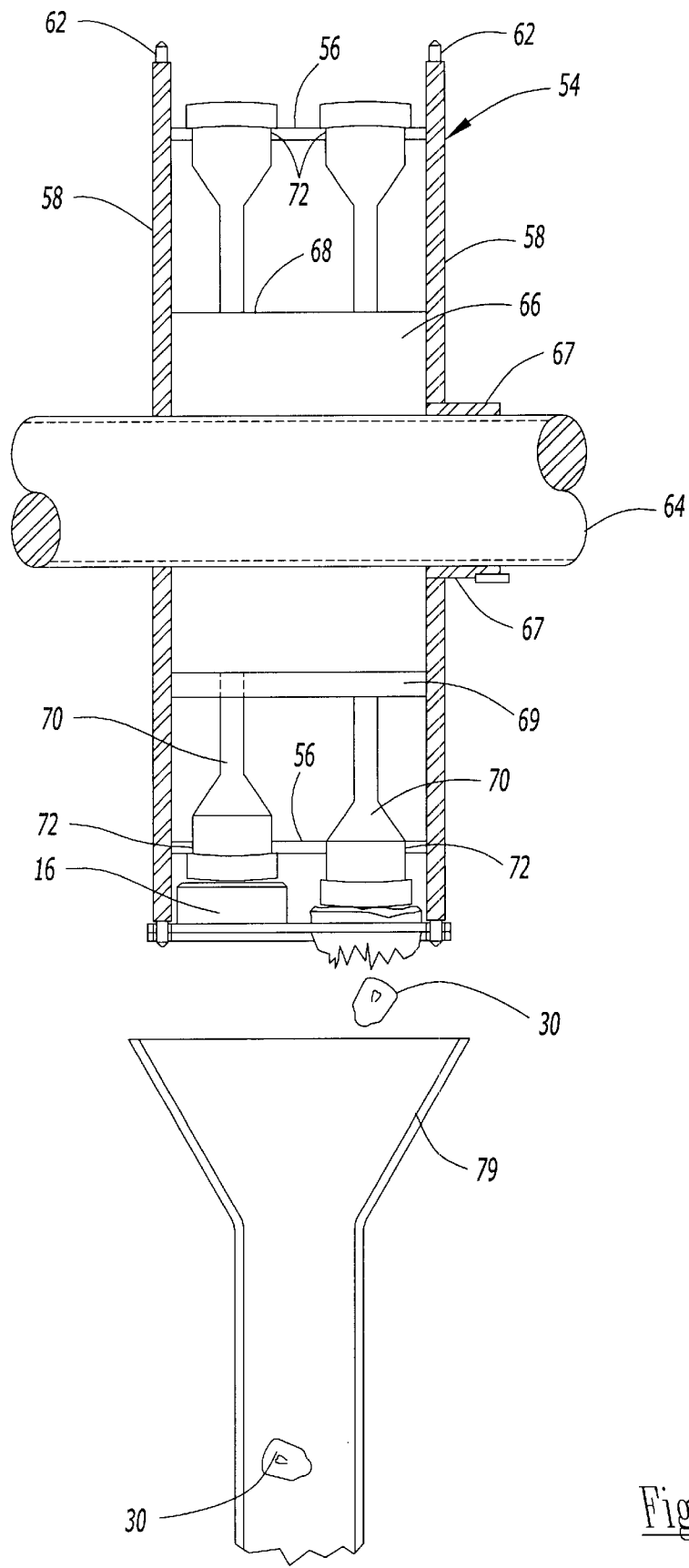
FIG. 5 is a sectional view taken on line 5—5 of FIG. 4.

A center shaft 64 extends through wheel 54 and is operatively connected in any convenient way to a motor 65 (FIG. 6). A stationary cam 66 is rotatably mounted on shaft 64 and slidable between flanges 58 and is rigidly supported by any sleeve and key 67 (FIG. 5) means so that the wheel 54 can rotate with respect to the stationary cam 66. Sleeve and key means 67 are rigidly connected to any stationary frame (not shown). The cam 66 has a circular cam surface 68 (FIGS. 3 and 4) which extend essentially around the periphery of the cam 66 to be interrupted only by a radially extending cam element 69 which is located at a 6 o'clock position (FIG. 4). A plurality of radially extending pistons 70 extend through apertures 72 in the drum 56 and are slidably mounted therein. The normal position of the pistons are best shown in FIG. 3 where they protrude only slightly through the drum to the outside surface of the drum. Retaining springs (not shown) can be used in conjunction with pistons 70 to normally maintain their dormant position when the inner ends of the pistons are in engagement with the circular cam surface 68. When the pistons engage the cam element 69 at the 6 o'clock position, the cam element exerts radial pressure on the inner ends of the pistons and forces the pistons outwardly through the apertures 72 to engage and crush the cell 16 of a cell pack longitudinally extending therebelow to force the seed 30 in the individual cell 16 downwardly through the bottom base layer 12 to be deposited in a seed delivery tube 79 of a seed planting mechanism (FIG. 4).

Figure 12:
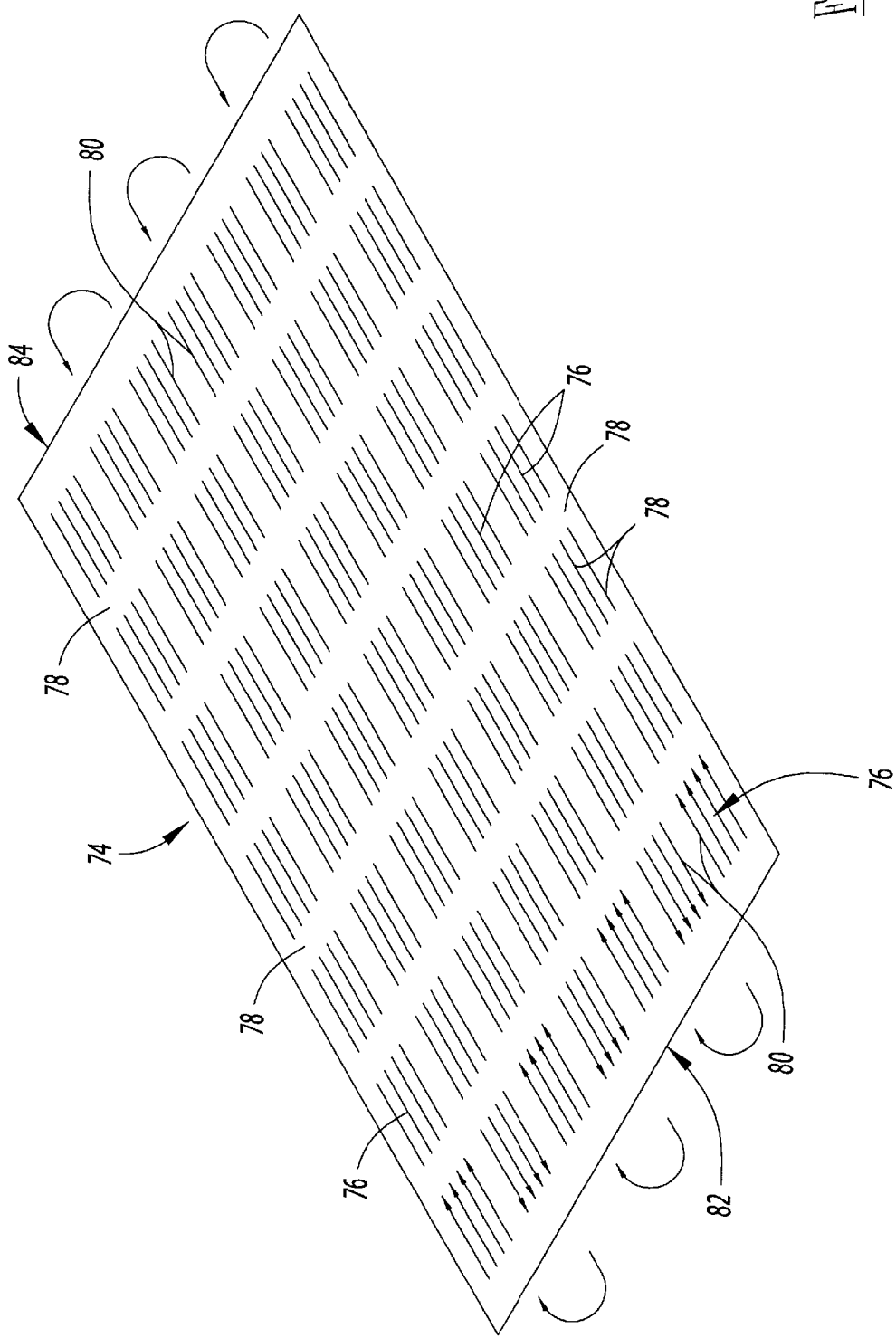
FIG. 12 is a schematic view of a typical research field wherein seeds are planted in accordance with this invention.

A conventional seed planting research field 74 is shown in FIG. 12 and is comprised of a plurality of plots 76 separated by an alley 78. Each plot contains a plurality of parallel rows 80 which are in alignment with the rows of the adjacent plot on the opposite side of an alley 78. The numerals 82 and 84 designate opposite ends of the field 74.

Figure 8:
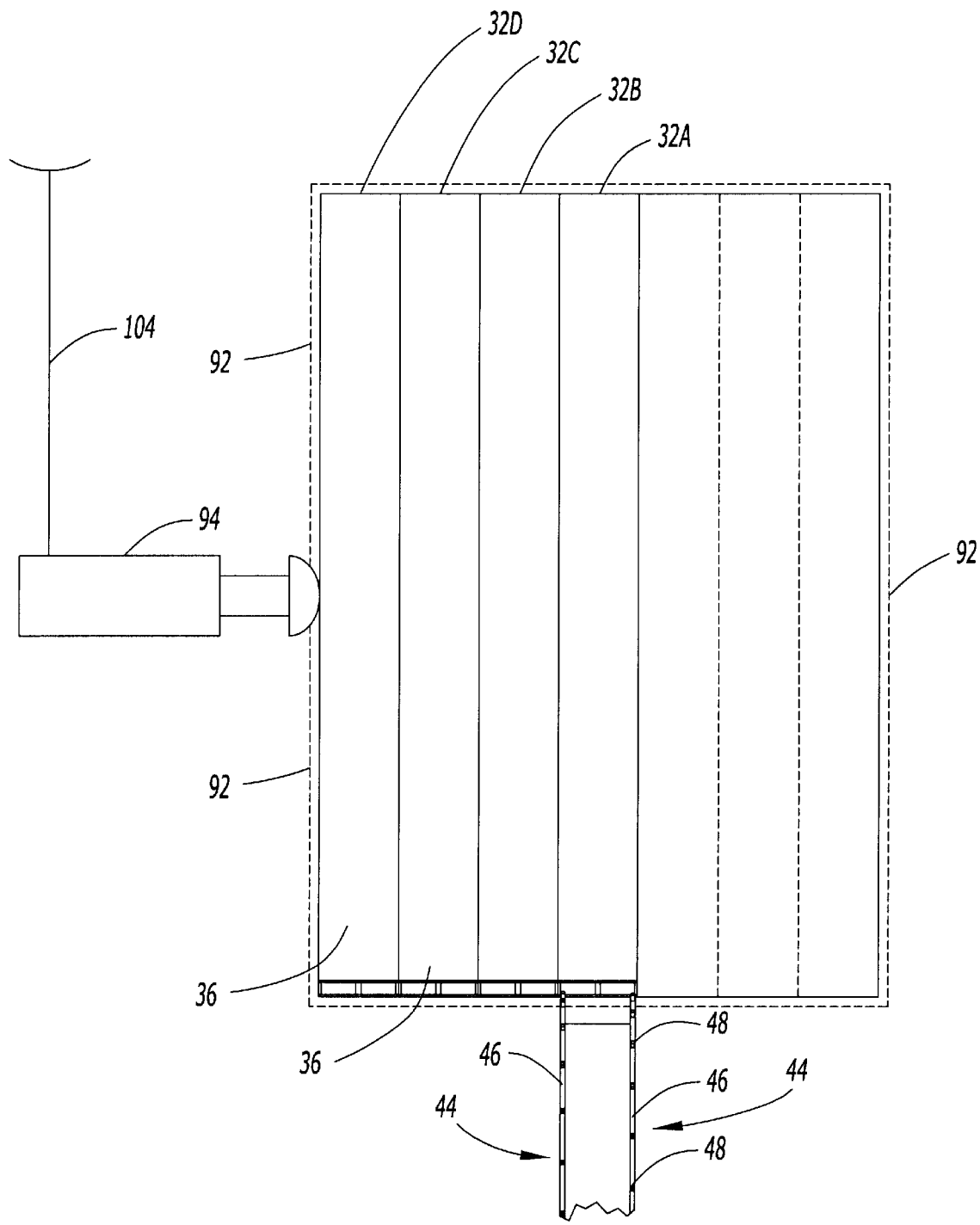
FIG. 8 is an elevational view taken on line 8—8 of FIG. 6.
Figure 11:
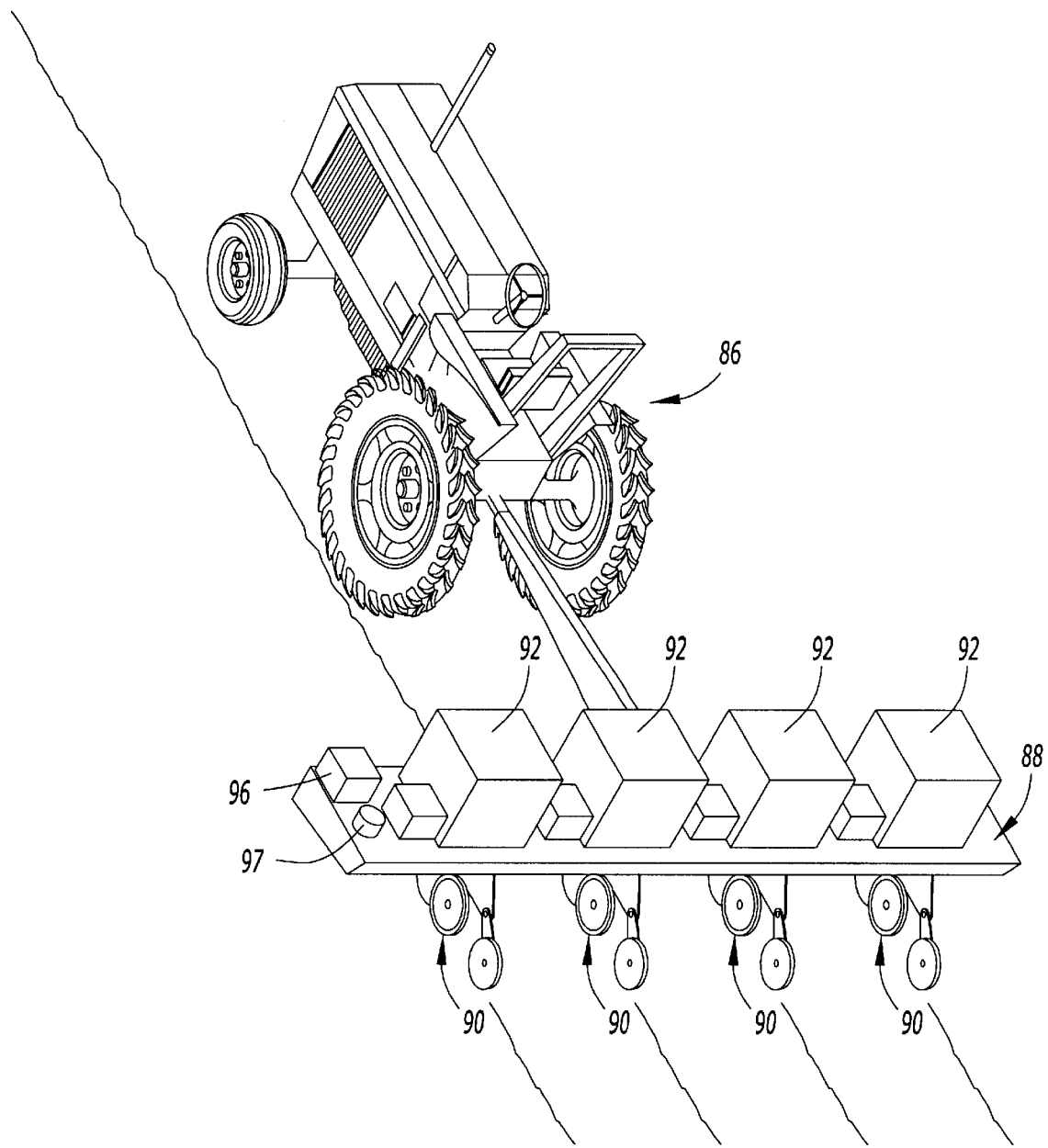
FIG. 11 is a perspective view of a tractor and planter assembly utilizing the invention.

A conventional tractor 86 is shown in FIG. 11 and it is attached to a conventional draw bar 88 upon which are mounted a plurality of seed planter units 90. FIG. 11 shows a four-row planter, but the number of rows are optional and can be increased to six, eight, or twelve rows. A plurality of magazine assemblies 92 are mounted on the draw bar 88. The magazine assemblies include a plurality of the magazines 32A–32D (FIG. 8). A magazine indexer 94 is mounted adjacent one side of the magazine assembly 92 and is adapted, upon actuation, to selectively move one of the magazines over the chain bar 44 which is located at the center bottom of the magazine assembly 92 (FIG. 8). Magazine indexer 94 can be comprised of a solenoid or air actuated piston or the like.

A computer controller 96 is mounted in any convenient location on the draw bar 88 along with a GPS unit 97.

A sensor 98 (FIG. 6) capable of reading a bar code (not shown) on the bottom of each cell pack strip 24 is located immediately below the longitudinal path of travel of a cell pack 10 from the magazine assembly 92 towards the punch wheel 54 (FIG. 6). The sensor 98 is connected to computer controller 96 by lead 98A (FIG. 6). If the computer 96 detects from sensor 98 that the wrong cell pack strip 24 is moving towards punch wheel 54, an alarm controlled by the computer would sound to alert the operator of the problem. Sensor 100 (FIG. 6) is a timing sensor to guarantee that the cell pack strips 24 are coming out of magazine assembly 92 at the correct spaced sequence. If the computer 96 detects a delay in the following cell pack strips, it would adjust the stepper motor 52 to correct the situation. The computer 96 has a stay mode that stops motor 52 when alleys in the field between plots are encountered. Similarly, lead 102 connects motor 52 to the controller 96. Lead 104 connects the controller 96 with the magazine indexer 94. Lead 106 connects motor 65 with the controller 96.

Figure 13:
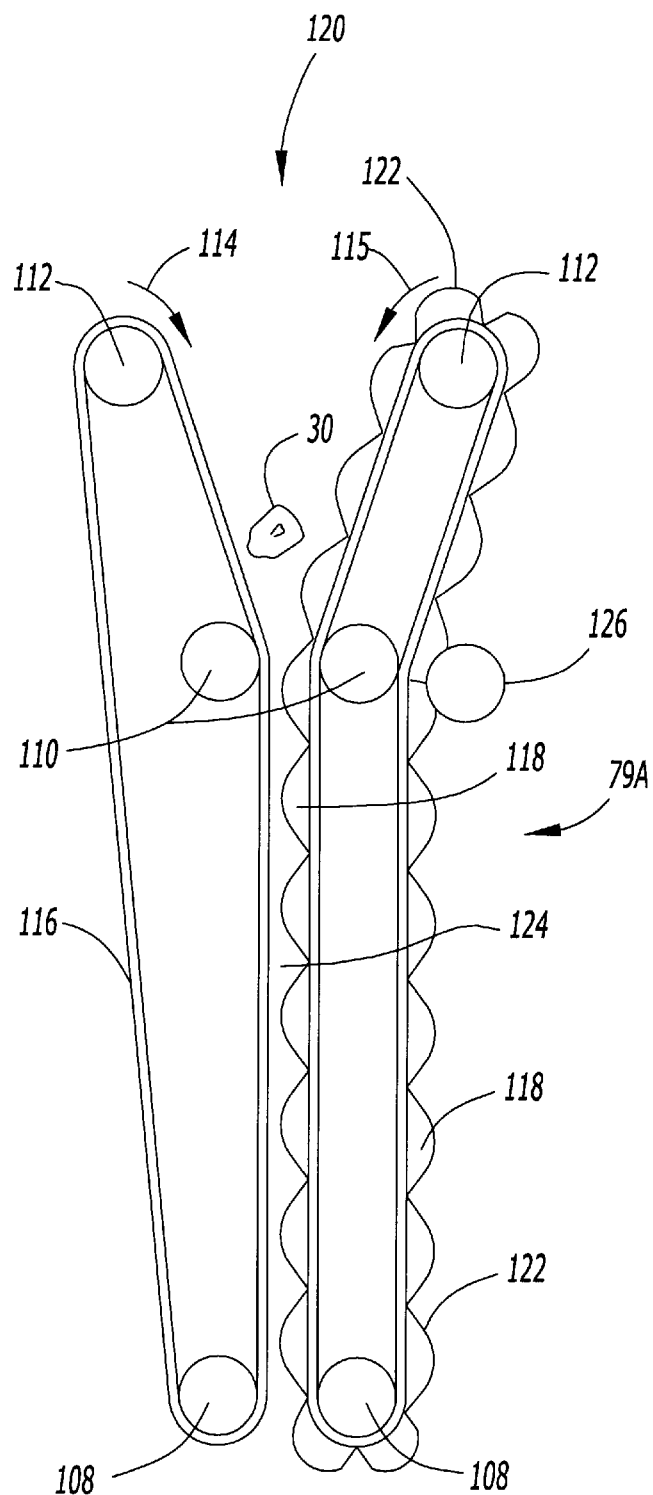
FIG. 13 is an alternate form of a seed delivery spout for a cam planter using this invention.

FIG. 13 shows an alternative seed delivery mechanism 79A for delivering seed 30 to planter units 90. A pair of closely spaced idler rolls 108 are secured by any conventional bracket (not shown) on the lower portion of each planter unit 90. A second pair of spaced idler rolls 110 are positioned above rolls 108. A third pair of driven rolls 112 are located above and outwardly above rolls 112. Rolls 112 are rotated in opposite directions by any convenient power source (not shown) in the direction of arrows 114 and 115.

A continuous belt 116 is extended around one each of rolls 108, 110 and 112, and belt 118 is extended around the remaining rolls 108, 110 and 112. The belts 116 and 118 form a throat-like space 120 between rolls 112. At least one of the belts, e.g., belt 118 has a foam or rubber material 122 on the surface thereof to lightly frictionally grip a seed 30 to move it into the throat 120 and thence downwardly in space 124 between the belts for discharge into the ground through a shoe or the like (not shown). A further idler roll 126 keeps belt 118 in contact with adjacent roll 110.

With reference to FIG. 12, a "row blueprint" is created for every research field 74. The row blueprint would specify the variety of seeds to be planted in each individual row 80 of each individual plot 76. The spacing of the seeds in each given row would also be determined. The blueprints of several fields would be imposed on the memory system of a computer so that the computer could determine the number of rows among the various fields that had the same varieties and the same seed spacing.

Then, in the controlled environment of a laboratory, a plurality of computer controlled seed make up bowls 18 (each bowl having separate varieties of seed) (FIG. 1) would be used to fill the cells 16 in an elongated roll of cell pack strip material 14. When the seed layout for a given specific row was completed, layer 12 is adhered to layer 14 to encapsulate a seed 30 in each of the cells 16. The cell pack strip material is then cut to length by any convenient means so that a final cell pack strip 24 for a given row is created. This process is repeated so as to create an inventory of cell pack strips 24 which have identical specifications insofar as seed variety and spacing is concerned. This process is then repeated for all of the similar rows for all of the fields. The identical cell pack strips 24 are inventoried in groups, and each have a bar code on the outside of lower layer 12.

As the planting season approaches, attention is then given to the row blueprint of a single research field 74. Cell pack strips 24 are then sequentially selected so that a cell pack strip 24 for a first row in a plot 76 is placed in the bottom of a magazine 32A. Thence, a second cell pack strip 24 corresponding to the planting specifications for a row 80 in the next succeeding plot in alignment with the first selected row in the first plot is placed on top of the initial cell pack strip placed in the magazine 32A. This process is continued so that a given magazine sequentially contains the seed to be planted in the aligned rows 80 of plots 76 extending from one end 82 of field 74 to the opposite end 84.

If there are four rows in each plot, as indicated in FIG. 12, magazines 32A, 32B, 32C and 32D are sequentially filled with cell pack strips 24 corresponding to the row blueprint for each of the other three rows in each of the aligned plots extending from one end of the field 82 to the opposite end 84.

In reality, depending upon the total length of the field 74, the magazines 32A—32D could be filled with a plurality of cell pack strips that would take care of the planting needs of an initial pass of a planter longitudinally through the field, and also through a return pass of the planter over a return trip of the planter on the next adjacent four rows.

Thus, as indicated in FIG. 8, the magazine assembly 92 which is mounted on the planter and which is associated with the planting of a single continuous row can be loaded with individual magazines containing sufficient cell pack strips 24 to plant a continuous row (interrupted only by alleys 78) extending from one end of the field to the other. In the event that the field is of such length that a single magazine will not have enough cell pack strips 24 to plant the entire row. The computer 96 is programmed to actuate the magazine indexer 94 to cause a second magazine to move laterally into place in alignment with the chain bar 44 so that the planting of a continuous row will not be interrupted.

In practice, the individual magazine assemblies 92 are loaded with the individual magazines 32A–32D in the field in accordance with a planting blueprint for the field to be planted. When this is done, a manually held scanner can be used to scan bar codes on each of the individual magazines 32A–32B for comparison with stored data in the controller 96 to make sure that the magazine assemblies 92 have been correctly and accurately loaded.

As the planting starts, the GPS unit 97 is actuated in accordance with the teachings of pending U.S. patent application Ser. No. 09/430,973 so as to impose on the computer 96 the latitude and longitude of each individual row in each individual plot so as to facilitate identification of the variety of seed in each plot for data taking purposes during the growing and harvesting seasons.

As the tractor 86 moves longitudinally through the field, the planter units 90 for each individual row are fed by the structure essentially shown in FIGS. 4–8. The controller 96 controls the speed of motor 52 to actuate the chain 46 which in turn regulates the sequential removal of cell pack strips 24 from the individual magazines. Then, as described heretofore, the removed cell pack strip is moved into operating relationship with the punch wheel 54 shown best in FIGS. 4, 5 and 6 to sequentially punch the seed 30 in individual cells 16 for deposit into the planter units 90. As is apparent, except for computer 96, the components illustrated in FIGS. 4–8 are present on the draw bar 88 with one set of these components serving each of the planter units 90.

The sensor 98, as indicated above, reads the bar code on each cell pack strip 24 removed from each magazine 32A–32D and communicates with computer 96 to verify the accuracy of the sequence of cell pack strips in accordance with the row blueprint for the field being planted.

By placing two rows of cells 16 on the cell pack strips 24 (FIGS. 1 and 2), the overall length of the cell pack strip is minimized. Typically, the length of the cell pack strips would be in the order of 20 to 30 inches.

As is also apparent, a plurality of make up bowls 18 are required to complete the introduction of various varieties of seed 30 into the cells of the strip. This process is also typically computer controlled.

It is therefore seen that the entire array of seeds in a research field can be organized in the laboratory, taken to the fields at planting time, installed on the planter; and carefully monitored as each seed is placed in its predesignated position in predetermined rows and plots.

What is claimed is:

1. A method of planting field seeds in rows with different varieties of seeds, comprising, determining the varieties of seeds to be planted, placing the seeds for rows of predetermined length in different groups of elongated cell pack strips for each variety, with each cell pack strip including individual cells with individual seeds, selecting sequentially from the groups of cell pack strips a plurality of subgroups of cell pack strips in the chronological order that different varieties of seeds are to be planted in a single row of a field, and placing the subgroups in separate magazines to maintain the order of the subgroups for subsequent planting in the rows of a field.

2. The method of claim 1 wherein the location in a field is determined wherein the varieties of seeds are to be planted, mounting the magazines on a field row planter with the magazines being associated with the rows in the field to which the respective magazines correspond, moving the planter longitudinally through the field, sequentially and chronologically selecting the cell pack strips from the magazines containing seeds to be planted, sequentially breaking the cells of the cell pack strip in the order in which the seeds in each cell pack strip are to be planted to release the seeds from the cells, and depositing the seed from each cell in the soil in the row with which the magazine from whence it emanated was associated.

3. The method of claim 2 wherein an individual electronic barcode is placed on each cell pack strip to indicate the variety of the seed in the cell pack strip intended for planting in a row in the field.

4. The method of claim 3 wherein the barcodes are electronically scanned and compared electronically to a row blueprint of the field to be planted when the magazines are mounted on the field row planter to verify that the seeds in the magazines are consistent with the row blueprint of the field to be planted.

5. The method of claim 2 wherein the magazines are scanned upon being associated with the rows in the field to which the respective magazines correspond and compared to master row blueprint data to ensure that the magazines correspond to the master row blueprint data.

6. The method of claim 1 wherein individual seeds are placed within individual cells arranged in parallel rows on the cell pack strip.

7. The method of claim 6 wherein the individual cells in each row are staggered with respect to individual cells in the adjacent row.

8. A method of planting field seeds in rows with different varieties of seeds, comprising,
determining the varieties of seeds to be planted,
placing the seeds for rows of predetermined length in different groups of elongated seed pack strips for each variety, with each seed pack strip including individually packaged seeds,
selecting sequentially from the groups of seed pack strips a plurality of subgroups of seed pack strips in the chronological order that different varieties of seeds are to be planted in a single row of a field, and
placing the subgroups in separate magazines to maintain the order of the subgroups for subsequent planting in the rows of a field.

9. The method of claim 8 wherein the location in a field is determined wherein the varieties of seeds are to be planted, mounting the magazines on a field row planter with the magazines being associated with the rows in the field to which the respective magazines correspond, moving the planter longitudinally through the field, sequentially and chronologically selecting the seed pack strips from the magazines containing seeds to be planted, sequentially breaking the seed pack strip in the order in which the seeds in each seed pack strip are to be planted to individually release the seeds from the seed pack strip, and depositing the related seeds in the row with which the magazine from whence it emanated was associated.

10. The method of claim 9 wherein an individual electronic barcode is placed on each seed pack strip to indicate the variety of the seed in the cell pack strip intended for planting in a row in the field.

11. The method of claim 10 wherein the barcodes are electronically scanned and compared electronically to a row blueprint of the field to be planted when the magazines are mounted on the field row planter to verify that the seeds in the magazines are consistent with the row blueprint of the field to be planted.

12. The method of claim 11 wherein the magazines are scanned upon being associated with the rows in the field to which the respective magazines correspond and compared to master row blueprint data to ensure that the magazines correspond to the master row blueprint data.

13. The method of claim 8 wherein individual seeds are individually packaged in parallel rows in the seed pack strip.

14. The method of claim 13 wherein the individual seeds in each row are offset with respect to individual seeds in the adjacent row.

15. An apparatus for planting seed, comprising,
a seed row planter frame,
a plurality of row planter units on the frame,
a magazine assembly associated with each planter unit,
at least one seed magazine in each magazine assembly,
a plurality of elongated cell pack strips horizontally stacked in the seed magazine,
a plurality of enclosed seed cells with a seed therein on each cell pack strip,
means on the planter unit for extracting sequentially the cell pack strips from the magazine, and individually and sequentially extracting the seed from each cell and depositing the seed in one of the row planter units for planting,
a computer controller operatively connected to controlling and coordinating the extracting cell pack strips from the magazine, for extracting a seed from the seed cells as the seed row planter is moved longitudinally over a field to be planted.

16. The apparatus of claim 15 wherein a sensor is associated with the magazine and connected to the computer control to monitor the accuracy of the sequential removal of cell pack strips from the magazine according to a predetermined sequence programmed on the computer control.

17. The apparatus of claim 15 wherein the means for extracting the seed from the cells is a cam wheel with plungers thereon to break the cells according to a predetermined sequence to release a seed from a cell, the predetermined sequence being determined by the cam wheel being operatively connected to the computer controller.

18. A method of planting field seeds in rows with different varieties of seeds, comprising,
determining the varieties of seeds to be planted,
placing the seeds for rows of predetermined length in different groups of elongated cell pack strips for each variety, with each cell pack strip including individual cells with individual seeds,
selecting sequentially from the groups of cell pack strips a plurality of subgroups of cell pack strips in the chronological order that different varieties of seeds are to be planted in a single row of a field, and
placing the subgroups in separate magazines to maintain the order of the subgroups for subsequent planting in the rows of a field,
determining the variety of seeds to be planted involves preparing a seed planting plan for one or more fields whereby the fields are divided into a plurality of elongated parallel rows interrupted by a plurality of transverse alleys where no seed is to be planted with a predetermined number of row portions between alleys constituting a plot, with the rows of adjacent plots being aligned with each other on opposite sides of the alleys.

19. An apparatus for planting seed, comprising, a seed row planter frame, a plurality of row planter units on the frame, a magazine assembly associated with each planter unit, at least one seed magazine in each magazine assembly, a plurality of elongated pre-packaged cell pack strips horizontally stacked in the seed magazine, a plurality of enclosed seed cells with a pre-packaged seed therein on each cell pack strip, means on the planter unit for extracting sequentially the cell pack strips from the magazine, and individually and sequentially extracting the seed from each cell by sequentially breaking each cell by sequentially breaking each cell and depositing the seed in one of the row planter units for planting.

20. An apparatus for planting seed, comprising, a seed row planter frame, a plurality of row planter units on the frame, a magazine assembly associated with each planter unit, at least one seed magazine in each magazine assembly, a plurality of-elongated pre-packaged seed pack strips horizontally stacked in the seed magazine, a plurality of separate seeds individually pre-packaged in individual cells in the seed pack strip, means on the planter unit for extracting sequentially the seed pack strips from the magazine, and individually and sequentially extracting the seed from each seed pack strip by sequentially breaking each cell, and depositing the seed in one of the row planter units for planting.

21. An apparatus for planting seed, comprising, a seed row planter frame, a plurality of row planter units on the frame, a magazine assembly associated with each planter unit, at least one seed magazine in each magazine assembly, a plurality of elongated seed pack strips horizontally stacked in the seed magazine, a plurality of separate seeds in each cell pack strip, means on the planter unit for extracting sequentially the seed pack strips from the magazine, and individually and sequentially extracting the seed from each seed pack strip and depositing the seed in one of the row planter units for planting, a computer controller is operatively connected to controlling and coordinating the extracting seed pack strips from the magazine, for extracting a seed from the seed pack strips as the seed row planter is moved longitudinally over a field to be planted.

22. The apparatus of claim 21 wherein a sensor is associated with the magazine and connected to the computer control to monitor the accuracy of the sequential removal of seed pack strips from the magazine according to a predetermined sequence programmed on the computer control.

23. The apparatus of claim 22 wherein the means for extracting the seed from the seed pack strips is a cam wheel with plungers thereon to break the seed pack strip according to a predetermined sequence to release seeds individually from the seed pack strip, the predetermined sequence being determined by the cam wheel being operatively connected to the computer controller.

24. An apparatus for planting seed, comprising, a seed row planter frame, a plurality of row planter units on the frame, a magazine assembly associated with each planter unit, at least one seed magazine in each magazine assembly, a plurality of elongated pre-packaged cell pack strips horizontally stacked in the seed magazine, a plurality of enclosed seed cells with pre-packaged seed therein on each cell pack strip, means on the planter unit for extracting sequentially the cell pack strips from the magazine, and individually and sequentially extracting the seed from each cell by sequentially breaking each cell and depositing the seed in one of the row planter units for planting, a computer controller operatively connected to controlling and coordinating the extracting cell pack strips from the magazine, for extracting a seed from the seed cells as the seed row planter is moved longitudinally over a field to be planted.

25. The apparatus of claim 24 wherein a sensor is associated with the magazine and connected to the computer control to monitor the accuracy of the sequential removal of cell pack strips from the magazine according to a predetermined sequence programmed on the computer control.

26. The apparatus of claim 25 wherein the means for extracting the seed from the cells is a cam wheel with plungers thereon to break the cells according to a predetermined sequence to release a seed from a cell, the predetermined sequence being determined by the cam wheel being operatively connected to the computer controller.

27. An apparatus for planting seed, comprising, a seed row planter frame, a plurality of row planter units on the frame, a magazine assembly associated with each planter unit, at least one seed magazine in each magazine assembly, a plurality of elongated pre-packaged seed pack strips horizontally stacked in the seed magazine, a plurality of separate seeds individually pre-packaged in individual cells in each seed pack strip, means on the planter unit for extracting sequentially the seed pack strips from the magazine, and individually and sequentially extracting the seed from each seed pack strip by sequentially breaking each cell, and depositing the seed in one of the row planter units for planting, a computer controller is operatively connected to controlling and coordinating the extracting seed pack strips from the magazine, for extracting a seed from the seed pack strips as the seed row planter is moved longitudinally over a field to be planted.

28. The apparatus of claim 27 wherein a sensor is associated with the magazine and connected to the computer control to monitor the accuracy of the sequential removal of cell pack strips from the magazine according to a predetermined sequence programmed on the computer control.

29. The apparatus of claim 28 wherein a sensor is associated with the magazine and connected to the computer control to monitor the accuracy of the sequential removal of cell pack strips from the magazine according to a predetermined sequence programmed on the computer control.

30. An apparatus for planting seed, comprising, a seed row planter frame, a plurality of row planter units on the frame, a magazine assembly associated with each planter unit, at least one seed magazine in each magazine assembly, a plurality of elongated seed pack strips horizontally stacked in the seed magazine, a plurality of separate seeds in each cell pack strip, means on the planter unit for extracting sequentially the seed pack strips from the magazine, and individually and sequentially extracting the seed from each seed pack strip and depositing the seed in one of the row planter units for planting.

* * * * *